(No Model.)

A. SCHAUSTEN.
BATTERY OR TURRET FOR COAST DEFENSE.

No. 600,891. Patented Mar. 22, 1898.

Witnesses:

Inventor:
A. Schausten,
By F. C. Brecht,
Attorney.

UNITED STATES PATENT OFFICE.

AUGUST SCHAUSTEN, OF WASHINGTON, DISTRICT OF COLUMBIA.

BATTERY OR TURRET FOR COAST DEFENSE.

SPECIFICATION forming part of Letters Patent No. 600,891, dated March 22, 1898.

Application filed March 10, 1897. Serial No. 626,790. (No model.)

*To all whom it may concern:*

Be it known that I, AUGUST SCHAUSTEN, a citizen of the United States, residing at Washington, in the District of Columbia, have invented certain new and useful Improvements in Batteries or Turrets for Coast Defense; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in the peculiar construction of batteries or turrets for coast and harbor defense; and the objects of the invention are to arrange a series of revolving armored batteries or turrets along a coast, but of a diameter merely sufficient to support the cannons, preferably of the heaviest caliber, and necessary adjuncts—machinery, room for men, ammunition, &c.

The floating batteries are to be towed to points most desirable for the defense of harbors, mouths of rivers, or other places where a landing by an enemy might be attempted, or the batteries may be placed in artificial tanks or excavations filled with sufficient water to float said batteries. Another object is that only a comparatively small number of men will be necessary to operate said batteries, and finally to produce these batteries with inclined sides of about thirty degrees, more or less, slanting outward from the bottom to the top, so as to cause the shot to glance off instead of striking the face at right angles, thereby reducing the energy of the projectiles against the armor-plate and causing the shot to enter the water, and if shell to be extinguished.

The invention consists in the peculiar construction of such batteries or turrets and the general arrangement of said batteries along a coast of a country for its protection.

It also consists in the construction of certain details and the combination of parts, as will be more fully described hereinafter and specifically pointed out in the claim, reference being had to the accompanying drawings and the letters thereon.

Like letters indicate similar parts in the different figures of the drawings, in which—

Figure 1:
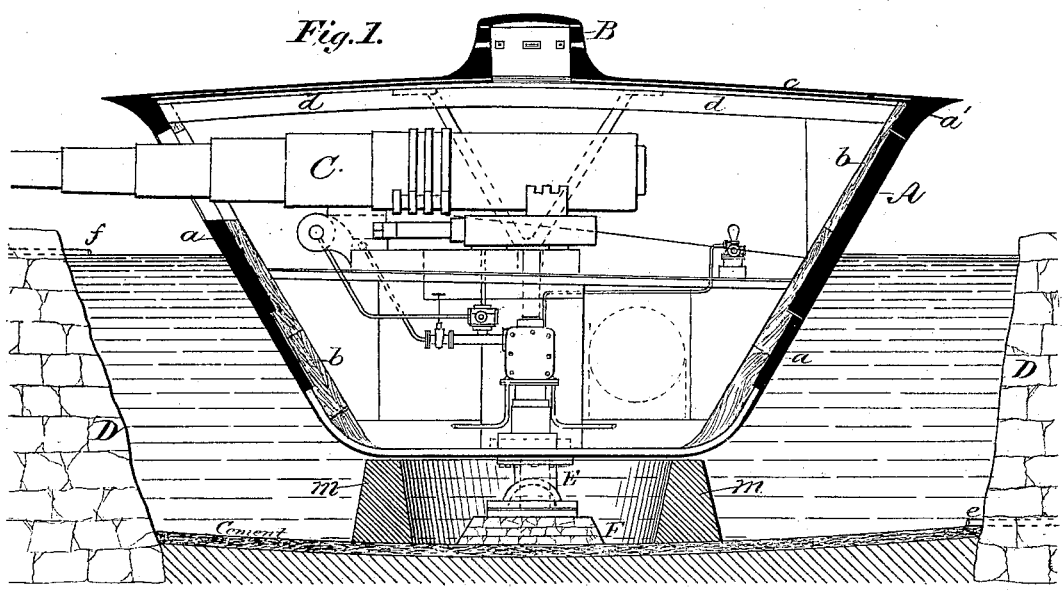
Figure 3:
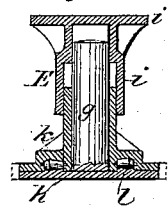
Figure 2:
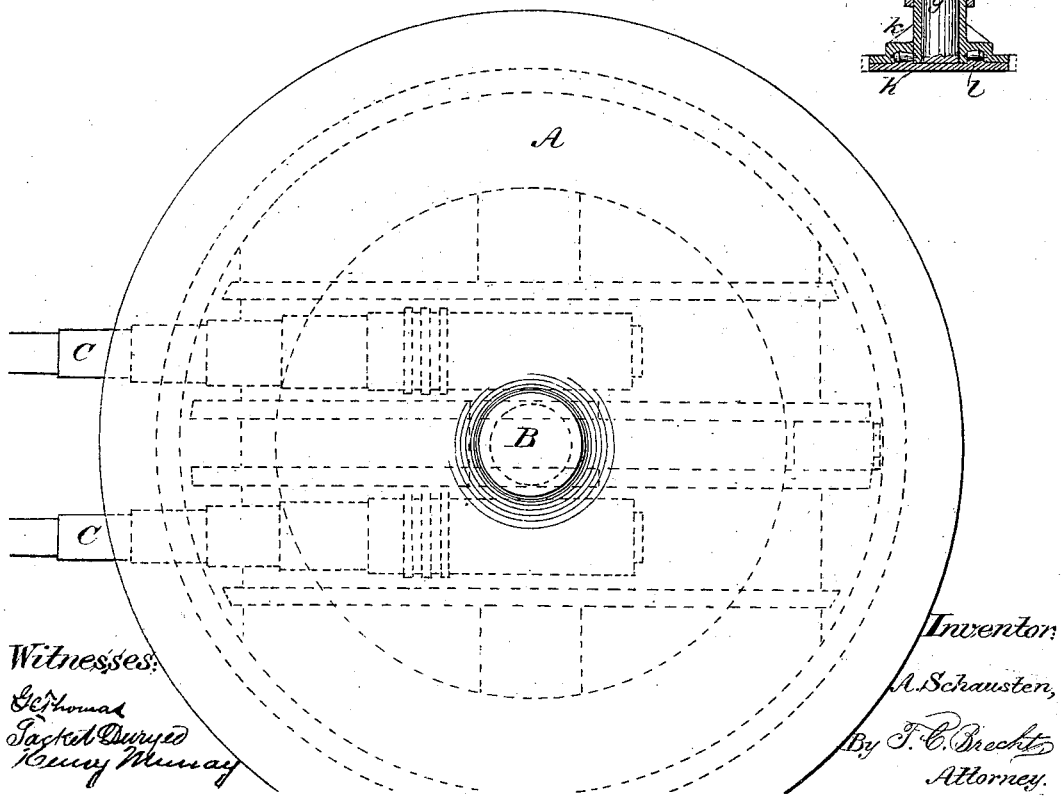

Figure 1 represents a vertical cross-section of a battery arranged in a tank containing water. Fig. 2 is a plan or top view of the same. Fig. 3 is a detail view of a part of the battery on an enlarged scale.

In the drawings, A represents a floating battery whose sides are armored with steel plates $a$, secured to wood or iron backing $b$ or its equivalent and of proper thickness to resist the heaviest projectiles from an enemy's cannon. The sides are arranged so as to expose an angle of thirty degrees, more or less, to an enemy's fire and sloping from the lower part outward, so as to cause the shot to glance off instead of striking the face at right angles. The batteries are thus made invulnerable to the projectiles fired by the most modern and largest guns in use. This is a very important feature of my invention, and thus the plates may be made much thinner and lighter than when placed vertical or sloping backward, as now usually the case.

The upper annular rim $a'$ of the battery or turret is made solid, so as to prevent the plates $c$ of the top being ripped at the edges where riveted. The top or roof is supported on T or angle iron girders $d$, secured to the sides. In the center of the roof is placed a conning-tower B of proper size and thickness, and where it is joined to the roof it is made with a large radius to prevent jamming by shot. The lower edges of the sides and bottom may be rounded or square, as desired. The battery can be made with one, two, or more decks, the upper one to contain the cannons C, of which there may be two or more, according to the size of the turrets desired. The machinery can be placed below the upper deck and may be used for operating the turret, the cannons, and for other purposes. The batteries may be built with port-holes, embrasures, or disappearing guns, as desired.

In case the battery is placed in a tank D, which may be made of masonry and have an inlet $e$ and an outlet or overflow $f$, it is preferable in this instance to place the turret on a pivot E, which may be of the ball-and-socket-joint kind, or it may be constructed as shown in Fig. 3 or any equivalents thereof. It consists in this case of a central pin $g$, secured to a plate with flange, by which it is anchored to a foundation F of masonry or other material by bolts, &c. Over this pin a sleeve $i$ fits to slide up and down to make the turret adjustable as the water rises and falls. It is made adjustable to slide up and down in the sleeve $i$, secured to the bottom by the flange $i'$, so as to compensate for the different water-levels. A flange $k$ at the lower end is recessed to receive a number of conical or equivalent shaped friction-rollers $l$ to facilitate the revolving of the turret. These rollers $l$ may be spherical or other suitable shape to facilitate the revolving of the turret. The flange $k$ is provided with an auxiliary flange to extend over the flange $h$ of the pin $g$ to prevent mud, sand, &c., from getting between the rollers and flanges.

To prevent the battery from tilting too much, an annular structure $m$ of suitable material may be arranged in the tank, upon which the battery can rest when the tank is empty of water.

The bottom of the tank can be lined with cement or its equivalent to prevent the escape of the water.

The interior of the battery is properly braced and strengthened by angle or T irons, braces, or bulkheads and may be divided into compartments employed for different purposes and uses. These batteries should be so arranged as to expose a very small surface above the water-line to prevent being struck by an enemy's shot or projectiles.

The batteries in open waters are held and revolved by chains attached to anchors, or in case of batteries floating in artificial tanks or basins constructed on land by turning them on a central pivot or shaft by machinery placed at a safe distance below the water-line at the bottom of the battery.

To revolve these batteries in water will require little power, which could be furnished by electric, gas, hydraulic, pneumatic, oil, or other engines, thus saving space and permitting the battery to be made small, which is of great importance.

If desired, the battery may be arranged in such manner that part of the weight may be always carried on the annular structure to facilitate its revolving.

Having thus described my invention, what I claim and desire to secure by Letters Patent, is—

A floating battery provided with an inclined annular face, having its annular face inclined outward from the bottom to the top, and containing machinery for operating the battery and the cannons, and arranged on a pivot, in combination with an annular structure for resting and steadying the battery, all as set forth.

In testimony whereof I affix my signature in presence of witnesses.

AUGUST SCHAUSTEN.

Witnesses:
G. C. THOMAS,
SACKET DURYEA,
HENRY MURRAY.